Figure 1:
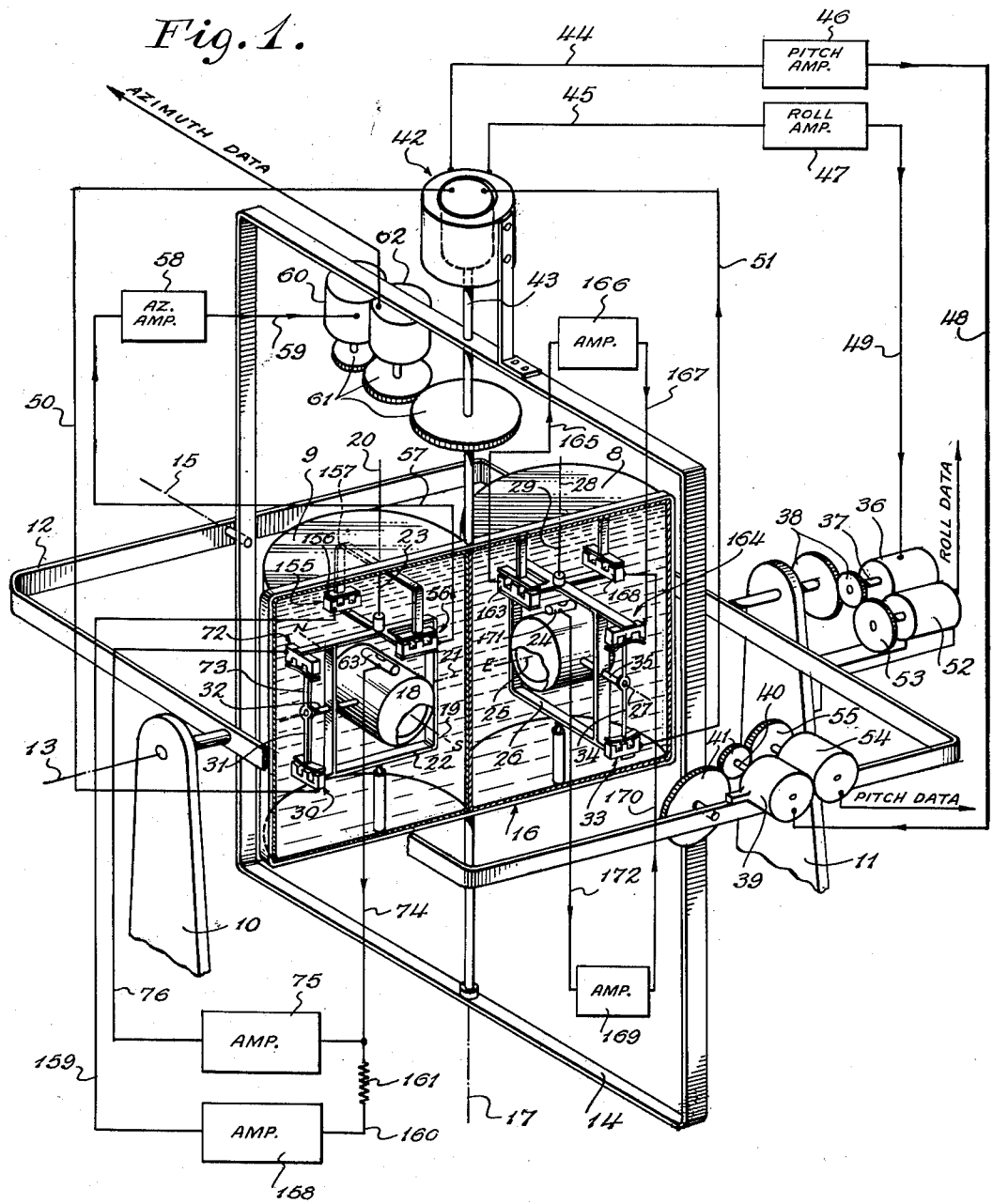

Jan. 3, 1956   F. D. BRADDON   2,729,107
GYROSCOPIC INSTRUMENT
Filed Dec. 13, 1951   2 Sheets-Sheet 1

INVENTOR
FREDERICK D. BRADDON
BY
Arthur H. Serrell
ATTORNEY

Jan. 3, 1956 F. D. BRADDON 2,729,107
GYROSCOPIC INSTRUMENT
Filed Dec. 13, 1951 2 Sheets-Sheet 2

INVENTOR
FREDERICK D. BRADDON
BY
Arthur H. Serrell
ATTORNEY

United States Patent Office 2,729,107
Patented Jan. 3, 1956

2,729,107

GYROSCOPIC INSTRUMENT

Frederick D. Braddon, Babylon, N. Y., assignor to Sperry Rand Corporation, a corporation of Delaware Application December 13, 1951, Serial No. 261,508

26 Claims. (Cl. 74—5.34)

This invention relates to gyroscopic instruments of the character known in the art as zenith meridian indicators and gyro compasses. The first of these noted types of instruments provides a three axis reference device for the dirigible craft on which it is mounted. Such devices define true North and the zenith and provide data of the azimuth position, roll attitude and pitch attitude of the craft, which information is useful in the navigation of the craft and for stabilization purposes. The second of the noted types of instruments provides only a single axis reference by which the position or attitude of the craft about its yaw or azimuth axis is determined. The angular motions of the craft about its athwartship, fore and aft, and yaw axes are measured by the improved instrument constructed in accordance with the present invention in terms of pitch attitude, roll attitude and heading, respectively.

The sensitive element of a gyroscopic instrument constructed in accordance with the present invention includes a pair of gyros of the directional type whose rotors are adapted to spin about horizontal axes, one of which is a meridian seeking gyroscope, i. e., a gyro-compass, and the other a directional gyro slaved in some manner to the gyro-compass to hold its spin axis normally East-West. The frames for the respective gyroscopic rotors are independently mounted on a common support. The frames for the rotors are interconnected by a slaving means adapted to maintain the spin axes of the rotors in mutually perpendicular relation. The instrument is provided with azimuthal directivity by gravity responsive means for the meridian gyro of the sensitive element whereby its horizontal spin axis is maintained in a North-South direction due to the effect thereon of the horizontal component of the earth's rotation. The slave gyro of the sensitive element includes a frame supporting a rotor whose horizontal spin axis points in an East-West direction. Both gyros are mounted in neutral equilibrium on the common support. The frames of both gyros are levelled with the spin axes of the rotors thereof in a horizontal plane as by means including electrolytic levels providing limited substantially linear outputs with tilt of the frames within a range, for example, of plus or minus one-half a degree from a level condition. The support for the gyros includes an azimuth or phantom member with freedom about a vertical axis that is mounted on a platform having freedom about mutually perpendicular horizontal axes. The azimuth member and platform are respectively positioned by an azimuth servomotor, and pitch and roll servomotors. The platform and azimuth member are effectively stabilized by a follow-up control from the sensitive element of the improved gyroscopic instrument which includes the respective servomotors. Azimuth, pitch and roll data transmitters are also operated by the respective servomotors. In the improved instrument, the rotors of the sensitive element are maintained at full operating speed regardless of the latitude of the craft. The pendulous factor provided by the gravity responsive means for the gyro- compass of the sensitive element is also maintained constant. Due to these conditions, the period of the improved instrument varies with the latitude of the craft on which it is mounted, but the rate of response of the instrument to disturbing accelerations remains constant at all latitudes.

One of the features of the present invention resides in the provision of gravity controllers for the sensitive element of the improved instrument in the form of electrolytic levels that provide limited substantially linear outputs within a tilt range of plus or minus one-half a degree from a level condition.

Still another feature of the invention is the provision of an instrument of this character having a sensitive element formed of two azimuth type gyros with horizontal spin axes, that are slaved through the phantom or vertical member of the instrument so that the spin axes thereof are maintained in mutually perpendicular relation.

The improved instrument also provides a gyro compass of the variable period type whose sensitive element includes a rotor that is driven at a constant speed, the sensitive element being mounted in neutral equilibrium and including thereon a gravitationally responsive means that provides the element with a constant pendulous factor.

Figures 2, 3:
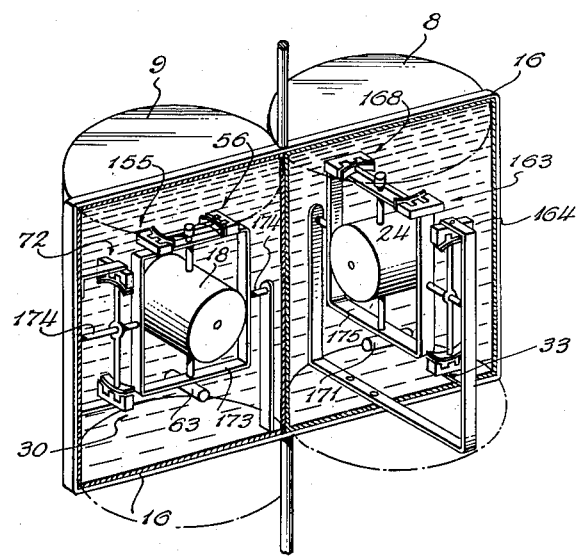

Other features and structural details of the invention will be apparent from the following description, when read in relation to the accompanying drawings, wherein:

Fig. 1 is a perspective view of a gyroscopic instrument embodying the present inventive concepts also illustrating the circuity between the related electrical parts, Fig. 2 is a partial view similar to Fig. 1 showing a modified form of the sensitive element in which the gimbals supporting the gyroscopic rotor frames of the instrument are inverted, and the liquid level devices are shown mounted on the gimbals, and Fig. 3 is an enlarged detail side elevation showing one of the gravity responsive electrolytic levels as employed in the improved gyroscopic instrument and also showing the input and output circuity therefor.

An instrument constructed in accordance with the present invention and illustrating the assembly of the gyroscopic parts is shown somewhat diagrammatically in Figs. 1 and 2 of the drawing. The instrument may include a suitable binnacle or housing that is understood to be fixedly mounted on the dirigible craft on which the device is used. As herein shown, the binnacle or housing fixed relative to the craft may include the spaced posts 10 and 11 which mount the device of the craft. The gyroscopic assembly includes a gimbal ring 12 mounted with freedom on the posts by suitable trunnion-bearing connections about a horizontal axis 13 which is arranged coincident with the fore and aft or roll axis of the dirigible craft on which the instrument is employed. Ring 12 supports a platform element 14 by suitable trunnion-bearing connection with freedom about a horizontal axis 15 that is coincident with the athwartship or pitch axis of the craft. Platform 14 is universally mounted relative to the housing of the instrument including posts 10 and 11 with freedom about mutually perpendicular, normally horizontal, axes 13 and 15.

The assembly also includes an azimuth or phantom member herein shown in the form of a ring 16 that is mounted on the platform element 14 with freedom about an azimuth or vertical axis indicated at 17. The connections between the platform 14 and member 16 are provided by suitable trunnions and bearings, as shown. Member 16 is supported with three degrees of freedom relative to the craft or binnacle of the instrument provided by mutually perpendicular axes 13, 15 and 17.

As shown in Fig. 1, the sensitive element of the improved instrument may consist of two directional type gyros independently supported on the member 16. One of the gyros is provided with a gravity reference as hereinafter described to make the same seek the meridian. This gyro is consequently herein termed the meridian gyro. The other of the gyros is slaved to the meridian seeking gyro so that its normally horizontal spin axis is directed East-West. The frame or closed case of the meridian gyro is designated in Fig. 1 at 18. Frame 18 supports a gyroscopic rotor therein adapted to spin about a normally horizontal North-South directed axis 19 which in the position shown in Fig. 1, is parallel to the pitch axis 15 of the craft. With this position of the parts, it will be understood that the craft on which the instrument is mounted is proceeding on an East-West course. Suitable means such as a motor (not shown) is provided to drive the rotor of the frame 18 at a constant speed. As shown, rotor frame 18 is mounted on ring 16 in neutral equilibrium with freedom about a vertical axis 20 and a second horizontal axis 21 normal to its spin axis. The mounting provided in Fig. 1 is a vertical ring 22 suspended from member 16 by a wire 23. A suitable bearing connects the lower portion of ring 22 to member 16. Suitable trunnion-bearing connections are provided between the frame 18 and the ring 22, the same being, in this instance, in the horizontal plane defined by the mutually perpendicular axes 13 and 15. Frame 18 is consequently supported on the member 16 in neutral equilibrium with freedom about vertical axis 20 and horizontal axis 21 both of which are normal to the rotor spin axis 19. The rotor axis 19 as shown in Fig. 1 is located in the horizontal plane defined by the mutually perpendicular axes 13 and 15. The frame 18 of the meridian gyro is preferably closed and is supported on member 16 by flotation in a fluid filled cylindrical chamber designated at 9 that forms a part of the member 16. Chamber 9 envelopes the frame 18 and ring 22 and contains a suitable light viscosity oil adaptable for flotation purposes. This arrangement has the advantage of reducing the friction in the bearings mounting the case 18 on the member 16.

The frame of the slave gyro of the improved instrument is indicated at 24. The slaving connection between the gyros will be hereinafter described in detail. Frame 24 supports a gyroscopic rotor adapted to spin about a horizontal East-West axis 25, shown as situated in the horizontal plane defined by axes 13 and 15. Frame 24 is mounted with freedom by a suitable trunnion-bearing connection on a vertical ring 26, the axis of the connection being indicated at 27. As shown, axis 27 is situated in the horizontal plane defined by the axes 13 and 15 of the instrument, the same being directed North-South parallel to the spin axis of the rotor of frame 18. The rotor of the frame 24 is driven at a constant speed by suitable means not herein shown. Ring 26 is mounted on member 16, in a manner similar to ring 22, with freedom about a vertical axis 28. This mounting, as shown, may include a wire 29 connected to ring 26. Frame 24, like frame 18, is mounted in neutral equilibrium on the member 16. Frame 24 is closed and is preferably supported on member 16 in a flotation chamber 8 filled with the same character of fluid as employed in chamber 9. Member 16 supports a spaced pair of gyroscopic rotors with normally horizontal spin axes 19, 25 having frames 18, 24 mounted with freedom about vertical axes 20, 28 and normally horizontal axes 21, 27 perpendicular to the respective spin axes. Member 16 is movable about its axis 17 in a manner equivalent to that of the phantom ring in a conventional gyro compass structure. While, as shown, the spin axes 19 and 25 of the respective rotors of the instrument are normally situated in the horizontal plane defined by axes 13 and 15, such an arrangement is optional in the improved instrument.

A three axis gyroscopic reference instrument constructed in accordance with the present invention provides data relative to the pitch attitude, roll attitude and azimuth position of the craft. This data may be used in any conventional manner now known to the art such as for operating visual indicating repeaters for automatically piloting the craft or for stabilization of instruments employed on the craft.

The improved instrument includes means operable to stabilize the platform 14 about its horizontal axes 13 and 15 from the reference levels determined by the rotor frames 18 and 24 about the respective mutually perpendicular and horizontal axes 21 and 27 thereof. The horizontal plane provided by the noted axes of the frames 18 and 24 define the zenith reference plane of the instrument. Any tilt of the member 16 or table 14 relative to this defined plane is detected by a suitable pick-off associated with each of the frames 18 and 24. The pick-offs used for illustrative purposes in the drawings are an electromagnetic type of the character particularly described in Patent No. 2,419,979, issued May 6, 1947 to J. C. Wilson, that employs relatively movable armature and E-type wound stator parts.

As shown, the pick-off for frame 18 is indicated at 30. The armature of pick-off 30 may be connected to the frame 18 by way of an arm 31 fixed to an extending portion 32 of the trunnion connected to the frame 18. The stator part of the pick-off 30 may be fixedly connected to an extension of the ring 22. The pick-off 33 for frame 24 is shown mounted in a similar manner to that of pick-off 30. In this instance, the armature is connected to frame 24 by way of arm 34 that is fixed to an extending portion 35 of the trunnion connected to frame 24. For the particular heading of the craft, in which the parts of the instrument are illustrated, pick-off 30 measures tilt of the platform 14 about axis 13 and pick-off 33 measures tilt of the platform 14 about axis 15.

The pick-offs 30 and 33 function to provide stabilizing signals for the platform 14 to maintain the axes 13 and 15 thereof in the horizontal reference plane defined by the instrument. The stabilizing means for the platform 14 may include a suitable electric motor 36 situated on post 11 and drivably connected to the platform by way of shaft 37, gearing 38, and one of the trunnions for the gimbal ring 12 on which the platform is supported. Further included in the stabilizing means is a second suitable electric motor 39 mounted on the ring 12 and drivably connected to the platform by way of shaft 40 and gearing 41 to one of the trunnions supporting the platform on the ring 12. Motors 36 and 39 are energized from the signals of pick-offs 30 and 33 by way of a component resolver which may be of the type described in my Patent No. 2,533,217 issued December 12, 1950. The resolver indicated at 42 in Fig. 1, includes a wound stator part that is suitably fixed to the platform 14. The wound rotor part of the resolver 42 is fixed to an extending portion 43 of the upper trunnion of member 16. Motors 36 and 39 are connected to the stator part of the resolver 42 by way of respective leads 44, 45, conventional signal amplifiers designated as pitch amplifier 46 and roll amplifier 47, and respective leads 48 and 49. The input to the rotor part of resolver 42 is fed from pick-offs 30 and 33 by way of the respective leads 50 and 51.

The axis of member 16 of the instrument remains vertical and the member is stabilized in azimuth so that the rotor part of the resolver 42 is fixed in space. The azimuthal position of the stator part of the resolver depends on the heading of the craft on which the instrument is employed. With course changes of the craft, the platform 14 moves in azimuth with the craft as it is connected thereto by way of ring 12 and posts 10 and 11. The relative position of the stator and rotor parts of the resolver 42 is consequently dependant on the heading of the craft, the resolver functioning to properly apportion the signals of the pick-offs 30 and 33 to the roll motor 36 and the pitch member 39 to stabilize the platform about its respective axes 13 and 15 for all headings of the craft. Roll attitude of the craft from a reference position is measured by the instrument by the output of a suitable electrical signal transmitter 52 that may be mounted on the post 11. The rotor of transmitter 52 is positioned by the platform 14 through ring 12, gears 38 and a gear 53 in mesh with one of the gears 38. Pitch attitude of the craft from a reference position is measured by the instrument by the output of a suitable electrical signal transmitter 54 that is mounted on ring 12. The rotor of transmitter 54 is positioned by the platform 14 through gears 41 and a gear 55 in mesh with one of the gears 41. The designations "Roll Data" and "Pitch Data" are included in Fig. 1 in connection with the output leads shown for the respective signal transmitters 52 and 54.

Member 16 is stabilized or positioned about its axis 17 to remain fixed in space and thereby provide the reference from which the heading of the craft is determined. Member 16 also maintains the fixed orientation of the rotor of the resolver 42 of the instrument. Stabilization of member 16 is effected as a follow up from the directed azimuth position provided by one of the rotor frames of the instrument. As shown in Fig. 1, frame 18 is employed for this purpose, the rotor of this frame being directed North-South in a horizontal plane. The means operable to stabilize the member 16 about axis 17 from frame 18 includes a pick-off 56 of the type hereinbefore identified whose armature is shown fixed to the member 16 and whose wound stator is mounted on the ring 22. Pick-off 56 measures displacement of the parts about axis 20, the signal thereof being fed by way of lead 57, a suitable azimuth amplifier 58 and lead 59 to a suitable electric motor 60 mounted on platform 14. Motor 60 is operatively connected to the upper trunnion of the member 16 by way of gearing indicated at 61.

The azimuth data provided by the instrument may be obtained from a suitable electrical transmitter 62 fixed to platform 14. Transmitter 62 may be similar to the pitch and roll transmitters 54 and 52, the rotor of the transmitter being connected to one of the gears 61. The designation "Azimuth Data" is included in Fig. 1 in connection with the output lead for the transmitter 62. The output of transmitter 62 may be utilized in any manner now known to the art such as in the operation of electrical repeaters.

Frame 18 of the meridian gyro of the instrument provides a gyroscopic sensitive element that is mounted in neutral equilibrium whose rotor is driven at a constant speed. The azimuth control for this element or gyro to maintain its spin axis directed on the meridian is a gravitationally responsive means that provides the element with a torque equivalent to that of a constant pendulous factor. In particular, such means is provided by a gravitationally responsive liquid device such as an electrolytic level 63 that may be mounted on frame 18 as shown, to detect tilt thereof about the East-West axis 21. The level 63 detects tilt of the frame 18 about the East-West axis 21 due to the effect on the frame of the horizontal component of the earth's rotation.

Fig. 3 shows an enlarged view of one of the liquid level gravity responsive devices used in the improved instrument. As shown, the liquid level device is formed of a closed, slightly curved tube 64 of electrical insulating material containing therein a liquid of predetermined viscosity and capable of conducting electricity such as a conducting electrolyte which fills the housing except for an air bubble. Two horizontal electrodes 65 and 66 connected to the housing 64 extend through the electrolyte and into the bubble so that equal areas of the same are conductive when the level is horizontal and the bubble is centered. A third electrode of the device is indicated at 67. The input to level device 63 as shown in Fig. 3 may be provided by any suitable supply of alternating current electrical energy, as indicated at 68, that is fed to the primary of a transformer 69 whose secondary is connected to electrodes 65, 66. The output circuit of the device 63 is provided by lead 70 connected to electrode 67, and lead 71 having a center tap connection with the secondary of the transformer 69.

The electrodes 65 and 66 are so constructed and arranged in the electrolytic fluid in the housing 64 that the level device provides a limited signal output linearly proportional to tilt of the frame 18 about axis 21 within a range of not more than plus or minus one-half a degree from a level condition beyond which no increase in output occurs, i. e., the level is said to saturate. Thus the electrolytic level 63 on the frame 18 detects any out-of-level condition of the frame and provides a signal voltage within the determined limits that is proportional to the degree of the departure of the frame from a level condition about axis 21. For a greater tilt or under the influence of pronounced turns, the signal does not increase beyond this limit, thus limiting "ballistic deflection" to a negligible amount. The signal from the level 63 is employed to precess the frame 18 about its axis 20 by application of a torque about the horizontal axis 21 through means of a suitable torque motor indicated at 72. Motor 72, as herein shown, may be an A. C. induction type motor of the character described in Letters Patent No. 2,270,876, issued January 27, 1942 to O. Esval et al. As shown in Fig. 1 the electromagnetic three pole wound stator of motor 72 is fixedly mounted on ring 22. The cooperating inductive rotor member of the motor is mounted on an arm 73 connected to the extending portion 32 of one of the trunnions of the frame 18. Arms 73 and 31 may be provided by an integral piece that extends radially of axis 21, as shown. The signal output of the gravity responsive means or electrolytic level device 63 is fed to operate torque motor 72 by way of lead 74, an amplifier 75 and lead 76. Thusly, the spin axis of the rotor frame 18 is directly maintained on the meridian due to the effect on the instrument of the horizontal components of the earth's rotation as detected by the electrolytic level 63 on the frame 18.

The damping or levelling controls for the gyro instrument are exerted on the rotor frame 18 through the medium of a torque exerting means effective about azimuth axis 20 herein shown as a torque motor 155 which is illustrated of the same character as heretofore described torque motor 72. As shown in Fig. 1, the wound stator of motor 155 is suitably fixed to an extension 157 of the ring 22. The armature of the motor is mounted on an extension 156 from the phantom member 16. The input to motor 155 is obtained from an amplifier 158 by way of lead 159.

The control input for the amplifier 158 is obtained from lead 160 that connects with lead 74 which carries the East-West level signal from device 63. The portion of this control signal tapped from lead 74 by lead 160 is regulated by resistor 161 in lead 160, the same determining the ratio of the gravity or ballistic control torque and damping control torque for the instrument. The selected ratio may be such as to provide the variable period instrument with a three hour period at the latitude of New York City, New York, but the period is permitted to change with latitude.

Gyro frame 24 is slaved to gyro frame 18 so that the spin axis 25 of its rotor is directed East-West. The arrangement herein shown to perform this function, includes the heretofore described follow-up connection between frame 18 and the stabilized azimuth member 16. This connection includes the gearing 61 for driving the member 16, motor 60 drivably connected to the gearing 61, lead 59, azimuth amplifier 58, lead 57 and pick-off 56 at the meridian gyro. As shown, the rotor of the second or slave gyro spins about a normally horizontal axis 25 in its frame 24. The frame 24 is supported on the stabilized azimuth member 16 with freedom about a vertical or azimuth axis 28. The slaving arrangement herein shown further includes a second follow-up connection between the azimuth stabilized member 16 and the frame 24 by which the spin axis of the rotor of frame 24 is positioned in perpendicular relation to the North-South direction spin axis of the meridian gyro frame 18. Such second connection may include a pick-off 163, Fig. 1 which is shown to be of the same character as electrical pick-off 56 at the meridian gyro. The armature of pick-off 163 is mounted on member 16 through a suitable extension. The wound stator part of the pick-off 163 is connected to an extension of the vertical ring 26 that supports the frame 24. As arranged, the pick-off 163 measures any departure of the spin axis of the rotor of frame 24 from a directed East-West position. The output of the pick-off 163 is effective to restore the desired condition through the follow-up connection which further includes torque motor 164. Motor 164 operates to exert a torque about axis 27 of the frame 24 to precess the ring 26 in a direction to zero the operating output signal from pick-off 163. Motor 164 and pick-off 163 are connected as shown by way of lead 165, amplifier 166 and lead 167. As illustrated, motor 164 is of the same character as torque motors 72 and 155.

The slave gyro frame 24 provides a reference about the horizontal North-South axis 27 of the three-axis gyro instrument from which tilt data from pick-off 33 is obtained. Thus, in conjunction with the meridian gyro frame 18, the slave gyro frame 24 establishes a horizontal datum plane as defined by axis 27 of the slave gyro and by axis 21 of the meridian gyro. The levelling controls for the slave gyro are effected through a torque motor 168 similar to motors 164, 155 and 72. As shown, the armature of motor 168 is located on a suitable extension of member 16. The wound stator of the motor 168 is fixedly mounted to an extension from the ring 26. Motor 168, as shown, provides a means for exerting a torque about the vertical axis 28 of the ring 26 to precess the frame 24 about axis 27 to a level condition. The signal operating the motor 168 is obtained from a suitable amplifier 169 by way of lead 170.

The control for such motor includes a gravitationally responsive device such as an electrolytic level 171 located on frame 24. Level device 171 may be of the same character as device 63 on frame 18, the level then providing a limited output signal proportional to tilt of the frame 24 about North-South horizontal axis 27 within a range of plus or minus one-half a degree from a level condition. Lead 172 connects the gravity responsive electrolytic level 171 to the amplifier 169, the output of which controls torques 167—168.

As is common in liquid ballistics for gyro compasses, the surging of the liquid in the level during rolling and pitching of the ship is avoided by the viscous or damping properties of liquid flow in the level. By limiting the torque to that due to not more than half a degree tilt and by the damping action described, intercardinal rolling errors are substantially eliminated.

In the modification of the sensitive element shown in Fig. 2, the meridian gyro frame 18 is mounted on the member 16 in flotation chamber 9 by means of a gimbal ring designated at 173, which has its major axis horizontal and its minor axis vertical instead of vice versa as in Fig. 1. The rotor of frame 18 spins about a horizontal axis directed North-South in the same manner as the corresponding part shown in Fig. 1. In this instance, the ring 173 is mounted with freedom about a horizontal axis on the member 16 by suitable trunnion bearing connections. The horizontal trunnions of the ring 173 are indicated at 174. The frame 18, in turn, is mounted on the ring 173 with freedom about a vertical axis corresponding to axis 20 in Fig. 1. As shown, the horizontal axis pick-off and torque motor element for frame 18 correspond to the parts designated in Fig. 1 by pick-off 30 and torque motor 72. Likewise, the vertical axis pick-off and torque motor correspond to pick-off 56 and torque motor 155. The electrolytic level device 63 in Fig. 2 is shown in a fixedly mounted condition on the bottom of ring 173, the same functioning to detect tilt of the frame 18 about its East-West horizontal axis. The slave gyro frame 24 is similarly arranged in flotation chamber 8 by the inverted gimbal ring 175. Like level device 63, the electrolytic level 171 is situated on the bottom of ring 175 in a position to detect tilt of the frame 24 about the North-South horizontal axis. The slave gyro control torque motors and pick-offs as respectively designated at 164, 168 and 33, 163, correspond to the same elements heretofore described in connection with Fig. 1. Frame 24 is mounted on member 16 by ring 175, the ring 175 having freedom about a horizontal axis relative to member 16. The frame 24 is mounted on the ring 175 with freedom about a vertical axis corresponding to axis 28 in Fig. 1.

Throughout the drawings, the electrical circuit connections have been schematically indicated as extending directly between the electrically interconnected parts of the instrument. In practice, however, slip rings and brushes of conventional construction are provided at the bearing-trunnions connections between mechanically joined parts to facilitate the passage of electrical energy therethrough. Such details are not shown in the drawings in order to avoid unnecessary complication thereof.

Since many changes could be made in the above construction and many apparently widely different embodiments of the invention could be made without departing from the scope thereof, it is intended that all matter contained in the above description or shown in the accompanying drawings shall be interpreted as illustrative and not in a limiting sense. Thus, there are many features pertaining to the meridian gyro which apply equally well to a single gyro compass. Obviously, my invention may be used not only to furnish both stable azimuth and stable vertical references, but only one of said two references, if desired, may be needed for a given problem. In that case, the reference data not needed may be disregarded or not provided for. In passing, it is particularly noteworthy that my invention furnishes an unusually stable and accurate gyro vertical reference having a marked advantage over the usual type of gyro vertical which employs a gyroscope with a vertical spin axis with or without a gyroscope with a spin axis at an angle thereto.

What is claimed is:

1. A three axis gyroscopic reference instrument comprising a platform supported with freedom about pitch and roll axes, a member supported on said platform with freedom about a vertical axis, a first gyroscopic rotor with a normally horizontal spin axis having a frame mounted on said member in neutral equilibrium with freedom about a vertical axis and a horizontal axis, means for directing said first gyroscopic rotor frame about its vertical axis including a gravity responsive electrolytic level providing a limited substantially linear signal output with tilt of the frame about its horizontal axis within a range of plus or minus one-half a degree from a level condition, means responsive to the signal of said electrolytic level for also levelling the frame of the first gyroscopic rotor about its horizontal axis, a second gyroscopic rotor with a normally horizontal spin axis having a frame mounted on said member in neutral equilibrium with freedom about a vertical axis and a horizontal axis, means for slaving said second rotor to said first rotor so that the spin axis thereof is perpendicular to the spin axis of the first rotor, means for levelling the frame of the second rotor about its horizontal axis including a gravity responsive second electrolytic level providing a limited substantially linear signal output with tilt of the frame about its horizontal axis within a range of plus or minus one-half a degree from a level condition, means operable to stabilize said platform about its pitch and roll axes from the reference levels determined by the first and second rotor frames about the respective horizontal axes thereof, and means operable to stabilize said member about its vertical axis from the directed position provided by one of said rotor frames about its vertical axis.

2. A three axis gyroscopic reference instrument comprising a platform supported with freedom about pitch and roll axes, a member supported in said platform with freedom about a vertical axis, a pair of gyroscopic rotors with normally horizontal spin axes having frames mounted on said member with freedom about vertical axes and normally mutually perpendicular horizontal axes, directive means for precessing one of said gyroscopic rotors about its vertical axis so that its spin axis points North-South, means for levelling the frame of the North-South pointing rotor about its horizontal axis, means for slaving the other of the rotors from the North-South pointing rotor so that the same points East-West, means for levelling the frame of the East-West pointing rotor about its horizontal axis, means operable to stabilize said platform about its respective pitch and roll axes from the reference levels determined by the frames of the respective gyroscopic rotors about the respective horizontal axes thereof, and means operable to stabilize said member about its vertical axis from the frame of the North-South pointing gyroscopic rotor.

3. A gyroscopic instrument for dirigible craft comprising a platform supported on the craft with pitch and roll axes of freedom, a member supported on said platform with freedom about an azimuth axis, a first gyroscopic rotor with a normally horizontal spin axis pointing North-South having a frame mounted on said member with freedom about an azimuth axis and a horizontal axis, means for damping the oscillations of the frame of the first rotor about the North-South position, a second gyroscopic rotor with a normally horizontal spin axis having a frame mounted on said member with freedom about an azimuth axis and a horizontal axis, means for slaving said second rotor to said first rotor so that the same points East-West, means for levelling the frame of the East-West pointing rotor about its horizontal axis, means for stabilizing said platform about its pitch and roll axes in accordance with the reference levels determined by the frames of the gyroscopic rotors about the respective horizontal axes thereof, and means for stabilizing said member about its vertical axis from the azimuthal position of one of the gyroscopic rotor frames.

4. An instrument as claimed in claim 3, in which the rotor frames of the instrument are closed and are each supported on said member by flotation in fluid filled chambers, said chambers enveloping the frames and forming part of said member.

5. In a gyroscopic instrument, a mounting having pitch, roll, and azimuth axes of freedom, means for stabilizing said mounting about its respective axes including a reference device comprising a pair of gyroscopic rotors with normally horizontal spin axes having frames situated on said mounting in neutral equilibrium with freedom about azimuth axes and normally mutually perpendicular horizontal axes, gravity responsive means for precessing one of the gyroscopic rotor frames so that the spin axis of its rotor points North-South, means responsive to said gravity responsive means for also damping the first frame about the North-South axis, means for slaving the other gyroscopic rotor frame to the North-South pointing rotor so that its rotor points East-West, and means for levelling the frame of the East-West pointing rotor about its horizontal axis.

6. In a gyroscopic instrument, a mounting having pitch, roll and azimuth axes of freedom, means for stabilizing said mounting about its respective axes including a reference device comprising a pair of gyroscopic rotors with normally horizontal spin axes having respective frames situated on said mounting in neutral equilibrium with freedom about azimuth axes and normally mutually perpendicular horizontal axes, means including a gravity responsive electrolytic level providing a limited output signal in accordance with tilt of one of said frames about its horizontal axis due to the effect thereon of the earth's rotation, torque means for precessing said frame about its azimuth axis responsive to a part of the signal of said gravity signal means, damping torque means for precessing said frame about its horizontal axis responsive to a part of the signal of said gravity signal means, means for slaving the rotor of the other of the frames to the first rotor so that its spin axis is perpendicular to the spin axis of the first rotor, means including a second gravity responsive electrolytic level providing a limited signal in accordance with tilt of the other of the frames about its horizontal axis, and levelling torque means for precessing the other of the frames about its horizontal axis responsive to the signal of said second gravity responsive signal means.

7. In a gyroscopic instrument, a mounting having pitch, roll and azimuth axes of freedom, means for stabilizing said mounting about its axes including a reference device comprising a gyroscopic rotor with a normally horizontal spin axis having a frame situated on said mounting in neutral equilibrium with freedom about an azimuth axis and a horizontal axis perpendicular to its spin axis, means including a gravity responsive electrolytic level providing a limited substantially linear signal output with tilt of the frame about its horizontal axis in a range within plus or minus one-half a degree from a level condition, torque means for precessing the frame about its azimuth axis to a North-South position, responsive to a part of the signal of said electrolytic level, damping torque means for precessing the frame about its horizontal axis also responsive to a part of the signal of said electrolytic level, a second similar rotor and frame construction also supported in said mounting and slaving means controlled from the first frame for maintaining the spin axis of said second rotor East-West.

8. In a gyroscopic instrument, a mounting having pitch, roll and azimuth axes of freedom, means for stabilizing said mounting about its respective axes including a first gyroscopic element of the gyroscopic compass type with a normally horizontal spin axis having a frame situated on said mounting, said element being in neutral equilibrium about a second horizontal axis and having freedom about an azimuth axis, a second gyroscopic element of the slave directional gyro type with a normally horizontal spin axis having a frame situated on said mounting, said element being in neutral equilibrium about a second horizontal axis normal to said other horizontal axis with freedom about an azimuth axis, and a pick-off and torque motor combination arranged to apply a torque about said last-named horizontal axis upon departure in azimuth between said slave gyroscope and said follow-up frame to slave said frame so that the spin axes of the respective rotors are mutually perpendicular.

9. In a three axis gyroscopic reference instrument for dirigible craft, the combination of, a platform universally supported relative to the craft, a member supported on said platform with freedom about an azimuth axis, a first gyroscopic element having a rotor frame with a rotor adapted to spin about a normally horizontal axis and a ring mounted with freedom about a vertical axis on said member on which said frame is mounted with freedom about a horizontal axis, a second gyroscopic element having a rotor frame with a rotor adapted to spin about a normally horizontal axis and a ring mounted with freedom about a second vertical axis on said member on which said frame is mounted with freedom about a horizontal axis, one of said elements being a gyro compass and the other a directional gyroscope slaved to said gyro compass and a pick-off and torque motor combination operable to maintain the spin axes of the respective gyroscopic elements in mutually perpendicular relation.

10. An instrument as claimed in claim 9, in which the frames of the gyroscopic elements are each closed and are each supported on said member by flotation in an oil filled chamber, said chambers enveloping the frames and forming a part of said member.

11. In a three axis gyroscopic reference instrument for dirigible craft, the combination of, a platform universally supported relative to the craft, a member supported on said platform with freedom about an azimuth axis, a first gyroscopic element having a rotor frame with a rotor adapted to spin about a normally horizontal axis and a ring mounted with freedom about a horizontal axis on said member on which said frame is mounted with freedom about a vertical axis, a second gyroscopic element having a rotor frame with a rotor adapted to spin about a normally horizontal axis and a ring mounted with freedom about a second horizontal axis on said member on which said frame is mounted with freedom about a vertical axis, one of said elements being a gyro compass and the other a directional gyroscope slaved to said gyro compass and a pick-off and torque motor combination operable to maintain the spin axes of the respective gyroscopic elements in mutually perpendicular relation.

12. An instrument as claimed in claim 11, in which the frames of the gyroscopic elements are closed and are each supported on said member by flotation in an oil filled chamber, said chambers enveloping the frames and forming a part of said member.

13. A three axis gyroscopic reference instrument comprising a platform supported with freedom about pitch and roll axes, a member supported on said platform with freedom about a vertical axis, a first gyroscopic rotor with a normally horizontal spin axis having a frame mounted on said member with freedom about a vertical axis and a horizontal axis, gravity responsive means for said frame for orienting the spin axis into a North-South direction, means responsive to said gravity responsive means for also levelling said frame, a second gyroscopic rotor with a normally horizontal spin axis having a frame mounted on said member with freedom about a vertical axis and a horizontal axis, means for slaving said second frame to said first frame so that the rotor spin axis thereof is oriented to an East-West direction, means for levelling the spin axis of the second rotor, means operable to stabilize said platform about its respective pitch and roll axes from the reference levels determined by the first and second rotor frames about the respective horizontal axes thereof, and means operable to stabilize said member about its vertical axis from the orientation provided by one of said rotor frames about its vertical axis.

14. In a gyroscopic compass, a gyro rotor having a normally horizontal spin axis, a rotor case therefor mounted with freedom about a vertical axis and a normally horizontal axis perpendicular to said spin axis, a support within which said case is journalled about said vertical axis, means for mounting said support for freedom about a vertical axis, means for imparting meridian seeking properties to said case, including electromagnetic means for exerting a controlled torque about the horizontal axis of the case proportional to the strength of the signal applied thereto, signal generating means for operating said torquing means including a gravity responsive liquid level having a limited output proportional to the tilt of said casing about its horizontal axis within a tilt range on the order of plus or minus a half degree, and follow-up means for orienting said support to follow the orientation of said case.

15. In a gyroscopic compass, as claimed in claim 14, having a second gyroscopic rotor having a normally horizontal spin axis, a case mounted with freedom about a vertical axis in said support and a normally horizontal axis perpendicular to the spin axis, means for slaving said second case from the first case to maintain the spin axis thereof East-West, means for maintaining said spin axis level, and follow-up means controlled by departure of said East-West gyro from its proper orientation with respect to said support for orienting said gyro to follow the orientation of the first rotor case.

16. In a three axis reference device for ships and the like comprising universally mounted outer framework having freedom about the vertical and both horizontal axes, servomotors for controlling the position of said support about each of said axes, a sensitive element journalled in said support for freedom about a vertical axis, said sensitive element comprising containers for liquid, a gyro compass mounted within one container for orientation, a pick-off thereon controlling the servomotor for orienting said support in azimuth, a slaved gyroscope also mounted in the other container for freedom about a vertical axis, a pick-off between said support and gyro generating a signal upon departure from an East-West position of the spin axis of said slaved gyro, means for exerting a torque about the horizontal axis of said slaved gyro controlled by said signal, a third pick-off controlled by the horizontal position of the spin axis of the first gyro for controlling the servomotors acting about the horizontal axes of said support, a pick-off controlled by the horizontal position of the spin axis of the second gyroscope for also controlling said servomotors, and a direction resolver between said pick-offs and said servos for apportioning the signals from said pick-off in accordance with the orientation of the ship with respect to the meridian.

17. In a gyroscopic compass, a gyro rotor having a normally horizontal spin axis, a rotor case therefor mounted with freedom about a vertical axis and a normally horizontal axis perpendicular to said spin axis, a liquid container within which said case is journalled about said vertical axis and containing a liquid substantially relieving the bearings of load about said axes, means for mounting said container for freedom about a vertical axis, means for imparting meridian seeking properties to said case including electromagnetic means for exerting a controlled torque about the horizontal axis of the case proportional to the strength of the signal applied thereto, signal generating means for operating said torquing means including a gravity responsive liquid level having a limited output proportional to the tilt of said casing about its horizontal axis within a tilt range of plus or minus a half degree, and follow-up means for orienting said container to follow the orientation of said case.

18. In a gyroscopic compass, a gyro rotor having a normally horizontal spin axis, a rotor case therefor mounted with freedom about a vertical axis and a normally horizontal axis perpendicular to said spin axis, a liquid container within which said case is journalled about said vertical axis and containing a liquid substantially relieving the bearings of load about said axes, means for mounting said container for freedom about a vertical axis, means for imparting meridian seeking properties to said case including an electromagnetic torquer for exerting a controlled torque about the horizontal axis of the case proportional to the strength of the signal applied thereto, a signal generator for operating said torquing means including a gravity responsive liquid level, said torquer and level also being immersed in the liquid in said container, and follow-up means for orienting said container to follow the orientation of said case.

19. A gyro compass comprising a follow-up support, a sealed liquid container mounted thereon, a sealed gyro rotor case within said container and mounting the rotor and rotor spinning means within the same, a gimbal support immersed in said liquid and journaled within said container about an axis and journalling said rotor case therein about a second axis, one of said axes being normally horizontal and the other vertical, pick-off means responsive to relative orientation of said gyro and said support, electrical torquing means also within the container for applying torques about at least the horizontal axis of the gyro, a gravitational element on the gyro, the liquid within the container floating the gimbal support, rotor case, torquer and gravitational element so as to substantially relieve the gimbal bearings of weight, and a follow-up motor without said container and controlled by said pick-off means for orienting the follow-up support.

20. A gyro compass as claimed in claim 19 having a second electrical torquing means for applying a damping torque about the vertical axis of the gyro which is also immersed in and floated by said liquid.

21. A gyro compass having a gravitational factor comprising a level partially filled with a viscous electrolyte and of variable impedance having an electrical output proportional to limited tilt of the compass within a narrow range on the order of a few minutes, an electrical torquer controlled thereby such that the compass has a period of substantially more than an hour, said liquid level being so constructed and arranged as to saturate under acceleration forces greater than those equivalent to such limited tilts whereby during turns of the ship intercardinal rolling error and ballistic deflection are reduced or eliminated.

22. In a gyro compass, a gravitational factor thereon responsive to tilts and acceleration forces, means for limiting the output thereof to that due to a tilt of a few minutes, and electrical torquers controlled thereby, one for exerting meridian seeking torques about the horizontal axis of the compass and the other for exerting damping torques about the vertical axis of the compass, thereby reducing ballistic deflection and damping errors due to turns.

23. A gyro compass as claimed in claim 22 in which the gravitational factor comprises a level partially filled with a viscous electrolyte and having an impedance which varies with tilt up to a tilt of a few degrees.

24. A three axis gyroscopic reference instrument for ships of the gyro compass type comprising a platform supported with freedom about pitch and roll axes, a member supported on said platform with freedom therein about a vertical axis, a gyroscopic compass element mounted within said member for free orientation about a vertical axis including a rotor and its case with a normally horizontal spin axis, a frame within which said case is mounted for freedom about a horizontal and a vertical axis, pick-off means responsive to relative turning in azimuth of said frame and member, a follow-up motor controlled thereby for orienting said member about its vertical axis to maintain it on the meridian, a second gyroscopic element of the slave directional gyro type including a rotor and its case, a frame mounting said case for oscillation about a horizontal axis and turning about a vertical axis within said member, a pick-off between said frame and member about said vertical axis, and a torquer operable about said last-named horizontal axis and controlled by said pick-off to maintain a spin axis of said second rotor in perpendicular relationship to the spin axis of the first rotor.

25. A gyro compass having a gravitational responsive device including a conductive liquid having a linear output which varies in amount and sign with the amount and direction of tilt of the compass within a narrow range on the order of a few minutes, an electrical torquer controlled by said output and arranged to exert a meridian-seeking torque about the horizontal axis of said compass, said torquer being such as to impart to the compass a normal 85 to 90 minute period, said device being so constructed and arranged that the output does not materially increase under acceleration forces greater than those equivalent to such limited tilts whereby intercardinal rolling error and ballistic deflection are reduced or eliminated.

26. A three axis gyroscopic reference instrument for ships as claimed in claim 24, in which pick-offs are provided about the horizontal axis of support of each gyro, follow-up motors for stabilizing said platform about its pitch and roll axes controlled by said pick-offs, and a resolver interposed between said pick-offs and motors and oriented by the orientation of said member.

References Cited in the file of this patent
UNITED STATES PATENTS

| | | |
|---|---|---|
| 1,501,886 | Abbot | July 15, 1924 |
| 1,743,533 | Davis | Jan. 14, 1930 |
| 2,008,058 | Boykow | July 16, 1935 |
| 2,367,465 | Kunzer | Jan. 16, 1945 |
| 2,591,697 | Hays, Jr. | Apr. 8, 1952 |
| 2,637,914 | Rawlings | May 12, 1953 |